United States Patent
Shen et al.

(10) Patent No.: US 12,190,537 B2
(45) Date of Patent: Jan. 7, 2025

(54) REPAIRING IMAGE DEPTH VALUES FOR AN OBJECT WITH A LIGHT ABSORBING SURFACE

(71) Applicant: MICROSOFT TECHNOLOGY LICENSING, LLC, Redmond, WA (US)

(72) Inventors: JingJing Shen, Cambridge (GB); Erroll William Wood, Cambridge (GB); Toby Sharp, Cambridge (GB); Ivan Razumenic, Belgrade (RS); Tadas Baltrusaitis, Cambridge (GB); Julien Pascal Christophe Valentin, Zurich (CH); Predrag Jovanovic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 55 days.

(21) Appl. No.: 17/713,038

(22) Filed: Apr. 4, 2022

(65) Prior Publication Data

US 2023/0316552 A1    Oct. 5, 2023

(51) Int. Cl.
*G06T 7/55* (2017.01)
*G01S 17/86* (2020.01)
(Continued)

(52) U.S. Cl.
CPC ............... *G06T 7/55* (2017.01); *G01S 17/86* (2020.01); *G01S 17/894* (2020.01); *G06T 7/20* (2013.01);
(Continued)

(58) Field of Classification Search
CPC .... G06T 7/55; G06T 7/20; G06T 7/70; G06T 17/00; G06T 19/20; G06T 2200/08;
(Continued)

(56) References Cited

U.S. PATENT DOCUMENTS 9,245,501 B2    1/2016  Liu et al.
9,438,878 B2    9/2016  Niebla et al.
(Continued)

FOREIGN PATENT DOCUMENTS

CN    113888702 A  *  1/2022
WO    2015185537 A1    12/2015

OTHER PUBLICATIONS

CN1138888702A (Machine Translation on Sep. 23, 2023) (Year: 2022).*

(Continued)

*Primary Examiner* — Michael Le
(74) *Attorney, Agent, or Firm* — Newport IP, LLC; Jacob P. Rohwer

(57) ABSTRACT

The techniques described herein disclose a system that is configured to detect and track the three-dimensional pose of an object (e.g., a head-mounted display device) in a color image using an accessible three-dimensional model of the object. The system uses the three-dimensional pose of the object to repair pixel depth values associated with a region (e.g., a surface) of the object that is composed of material that absorbs light emitted by a time-of-flight depth sensor to determine depth. Consequently, a color-depth image (e.g., a Red-Green-Blue-Depth image or RGB-D image) can be produced that does not include dark holes on and around the region of the object that is composed of material that absorbs light emitted by the time-of-flight depth sensor.

18 Claims, 7 Drawing Sheets

(51) Int. Cl.

| | |
|---|---|
| *G01S 17/894* | (2020.01) |
| *G06T 7/20* | (2017.01) |
| *G06T 7/70* | (2017.01) |
| *G06T 17/00* | (2006.01) |
| *G06T 19/20* | (2011.01) |
| *G06V 10/22* | (2022.01) |
| *G06V 10/82* | (2022.01) |
| *G06V 20/64* | (2022.01) |
| *H04N 23/45* | (2023.01) |

(52) U.S. Cl.
CPC ............... *G06T 7/70* (2017.01); *G06T 17/00* (2013.01); *G06T 19/20* (2013.01); *G06V 10/22* (2022.01); *G06V 10/82* (2022.01); *G06V 20/647* (2022.01); *H04N 23/45* (2023.01); *G06T 2200/08* (2013.01); *G06T 2207/10021* (2013.01); *G06T 2207/10024* (2013.01); *G06T 2207/10028* (2013.01); *G06T 2210/56* (2013.01); *G06T 2219/2004* (2013.01); *G06T 2219/2016* (2013.01)

(58) Field of Classification Search
CPC . G06T 2207/10021; G06T 2207/10024; G06T 2207/10028; G06T 2210/56; G06T 2219/2004; G06T 2219/2016; G06T 5/77; G06T 2207/20084; G06T 7/75; G01S 17/86; G01S 17/894; G06V 10/22; G06V 10/82; G06V 20/647; H04N 23/45
See application file for complete search history.

(56) References Cited

U.S. PATENT DOCUMENTS

| | | | |
|---|---|---|---|
| 10,269,177 | B2 | 4/2019 | Frueh et al. |
| 10,504,274 | B2* | 12/2019 | Du .......................... G06T 17/00 |
| 10,769,411 | B2* | 9/2020 | Grabner .................. G06T 19/20 |
| 2016/0314613 | A1* | 10/2016 | Nowozin ................. G01S 7/497 |
| 2017/0041585 | A1* | 2/2017 | Liu ....................... H04N 13/271 |
| 2019/0200902 | A1* | 7/2019 | El Kouby-Benichou ..................... A61C 17/00 |
| 2019/0258225 | A1* | 8/2019 | Link ......................... G06T 7/70 |
| 2020/0000552 | A1* | 1/2020 | Mednikov ............... G06T 19/20 |
| 2020/0226786 | A1* | 7/2020 | Fitzgibbon .............. G06T 7/251 |
| 2021/0009080 | A1* | 1/2021 | Hu ........................ G06V 10/454 |
| 2021/0035303 | A1* | 2/2021 | Bleyer ...................... G06T 7/11 |

OTHER PUBLICATIONS

Ikbal, et al., "Dynamic Pose Tracking Performance Evaluation of HTC Vive Virtual Reality System", In journal of IEEE Access, vol. 9, Dec. 28, 2020, pp. 3798-3815.

Orts-Escolano, et al., "Holoportation: Virtual 3D Teleportation in Real-time", In Proceedings of the 29th Annual Symposium on User Interface Software and Technology, Oct. 16, 2016, 14 Pages.

Wu, et al., "Real-Time Estimation of Missing Markers for Reconstruction of Human Motion", In proceedings of XIII Symposium on Virtual Reality, May 23, 2011, 8 Pages.

Fischer, et al., "Evaluation of Point Cloud Streaming and Rendering for VR-Based Telepresence in the OR", In Proceedings of International Conference on Virtual Reality and Mixed Reality, 2022, pp. 89-110.

Nicolau, et al., "A Complete Augmented Reality Guidance System for Liver Punctures: First Clinical Evaluation", In Proceedings of 8th International Conference on Medical Image Computing and Computer-Assisted Intervention, Oct. 26, 2005, pp. 539-547.

"International Search Report and Written Opinion Issued in PCT Application No. PCT/US23/013441", Mailed Date: Jul. 6, 2023, 14 Pages.

Zhu, et al., "A shared augmented virtual environment for real-time mixed reality applications : Virtual Environment for Real-time Mixed Reality", In Journal of Computer Animation and Virtual Worlds vol. 29, Issue 5, Sep. 2018, pp. 1-14.

* cited by examiner

REPAIRING IMAGE DEPTH VALUES FOR AN OBJECT WITH A LIGHT ABSORBING SURFACE

BACKGROUND

Applications may use a depth image to display or reconstruct a three-dimensional environment. Some image capture devices use infra-red (IR) technology or other light-based technology to determine depth in a scene and create a depth image (e.g., a depth map). For example, a camera may use a time-of-flight depth sensor (e.g., an array of time-of-flight pixels) to illuminate a scene with light (e.g., an IR pattern) emitted from an artificial light source and to detect light that is reflected. The phase shift between the emitted light and the reflected light is measured and depth information for various pixels in a depth image can be determined based on the phase shift.

Unfortunately, the time-of-flight depth sensor may experience issues with respect to accurately determining depth information for a scene. For instance, an object in the scene may include a surface that is made of material that absorbs the emitted light (e.g., the IR pattern) so the time-of-flight depth sensor cannot clearly detect, or see, the light that is reflected. This lack of detection and/or visibility translates to missing or corrupted depth values in the depth image. In one example, a head-mounted device (e.g., augmented reality device, mixed reality device, etc.) includes an transparent visor that is composed of material that absorbs the emitted light. Consequently, the time-of-flight depth sensor is unable to accurately determine the depth values for the pixels that are associated with the transparent eye screen, and therefore, the resulting depth image includes dark holes on and around the user's eyes.

It is with respect to these and other considerations that the disclosure made herein is presented.

SUMMARY

The techniques disclosed herein enable a system to detect and track the three-dimensional pose of an object (e.g., a head-mounted display device) in a color image using an accessible three-dimensional model of the object. The system uses the three-dimensional pose of the object to repair pixel depth values associated with a region (e.g., a surface) of the object that is composed of material that absorbs light emitted by a time-of-flight depth sensor to determine depth. Consequently, a color-depth image can be produced that does not include dark holes on and around the region of the object that is composed of material that absorbs light emitted by the time-of-flight depth sensor.

The system is configured to obtain image data for a scene that was captured by an image capture device (e.g., a camera). The image data may include a sequence of frames that comprise a video (e.g., of a user wearing a head-mounted display device). The image capture device includes a color (e.g., Red-Green-Blue or RGB) sensor and a time-of-flight depth sensor, and thus, each frame includes a color image in a color coordinate space and a corresponding depth image in a depth coordinate space. In various examples, both coordinate spaces are right handed coordinate systems (e.g., X, Y, Z) with Z pointed out (e.g., towards a camera lens) and Y pointed up, but the coordinate spaces do not have the same origin and the axes are not colinear due to camera/sensor differences.

As described above, if the scene includes an object that has a region composed of material that absorbs emitted light (e.g., the IR pattern), then the time-of-flight depth sensor cannot clearly detect, or see, the light that is reflected. This lack of detection and/or visibility translates to missing or corrupted depth values in the depth image. That is, the depth image is likely to include dark holes on and around the region that absorbs the light emitted by the time-of-flight depth sensor.

To resolve the depth issues, the system is configured to detect (e.g., recognize) an object in the color image that is known to include a region (e.g., a surface) that absorbs the light emitted by the time-of-flight depth sensor. Once detected, the system predicts a set of two-dimensional points on the object in the color image that correspond to three-dimensional points that are predefined in an accessible three-dimensional model of the object. For instance, the three-dimensional points on the three-dimensional model of the object (may alternatively be referred to as key points or landmarks) are manually defined in advance and can be any points on the three-dimensional model. In some instance, they may be points associated with important/distinctive corners and edges of the region of the object that absorbs the light emitted by the time-of-flight depth sensor.

A first neural network or other form of artificial intelligence can be used to detect the object. For example, a Deep Neural Network (DNN) model may be trained using thousands or even millions of color image frames that are each individually annotated to indicate the shape, position, and/or orientation of an object known to cause problems with respect to depth value determination. A second neural network or other form of artificial intelligence can be used to predict the two-dimensional points. Example three-dimensional models may be readily generated by use of computer-aided design (CAD) software programs, and thus, the three-dimensional model may be a three-dimensional CAD "mesh" model.

Next, the system is configured to apply a prediction algorithm to the color image to compute a three-dimensional pose of the object in the color space. The prediction algorithm computes the three-dimensional pose of the object in the color space by positioning and/or rotating the three-dimensional model of the object until the two-dimensional points on the color image align with the corresponding three-dimensional points that are predefined in the three-dimensional model of the object. In various examples, the prediction algorithm uses a six degrees of freedom (6DoF) approach to predict the alignment. For instance, a Perspective-n-Point (PnP) algorithm is configured to estimate the pose of the image capture device, and this estimation can be extended to align the three-dimensional landmarks, defined via an accessible three-dimensional mesh model, with the two-dimensional landmarks on the color image.

Now that the system has predicted the three-dimensional pose of the object in the color image, the system applies a transform between the color space of the color image and the depth space of the depth image to compute a three-dimensional pose of the object in the depth space of the depth image. This transform may be necessary in scenarios where the color and depth coordinate spaces do not have the same origin and the axes are not colinear due to camera/sensor differences. The system can then use the three-dimensional pose of the object in the depth space of the depth image to repair depth values for pixels in the depth image that are associated with the region of the object that absorbs the light emitted by the time-of-flight depth sensor.

In various examples, the color image and the repaired depth image enable an RGB-Depth (RGB-D) image to be produced. Moreover, once the object has been detected in a first color image frame of a video, the system is configured to track the object in subsequent color image frames of the video. In various examples, different neural networks can be used to first detect the object and then to track the object. Tests have shown that a first neural network for detection takes about nine milliseconds per frame to repair the depth values and that a second neural network for tracking (once the object is already detected) takes about three milliseconds per frame to repair depth values.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses an image repair system that is configured to detect and track the three-dimensional pose of an object (e.g., a head-mounted display device) in a color image using an accessible three-dimensional model of the object. The system uses the three-dimensional pose of the object to repair pixel depth values associated with a region (e.g., a surface) of the object that is composed of material that absorbs light emitted by a time-of-flight depth sensor to determine depth. Consequently, a color-depth image (e.g., a Red-Green-Blue-Depth image or RGB-D image) can be produced that does not include dark holes on and around the region of the object that is composed of material that absorbs light emitted by the time-of-flight depth sensor. Various examples, scenarios, and aspects of the disclosed techniques are described below with reference to FIGS. 1-7.

Figure 1:
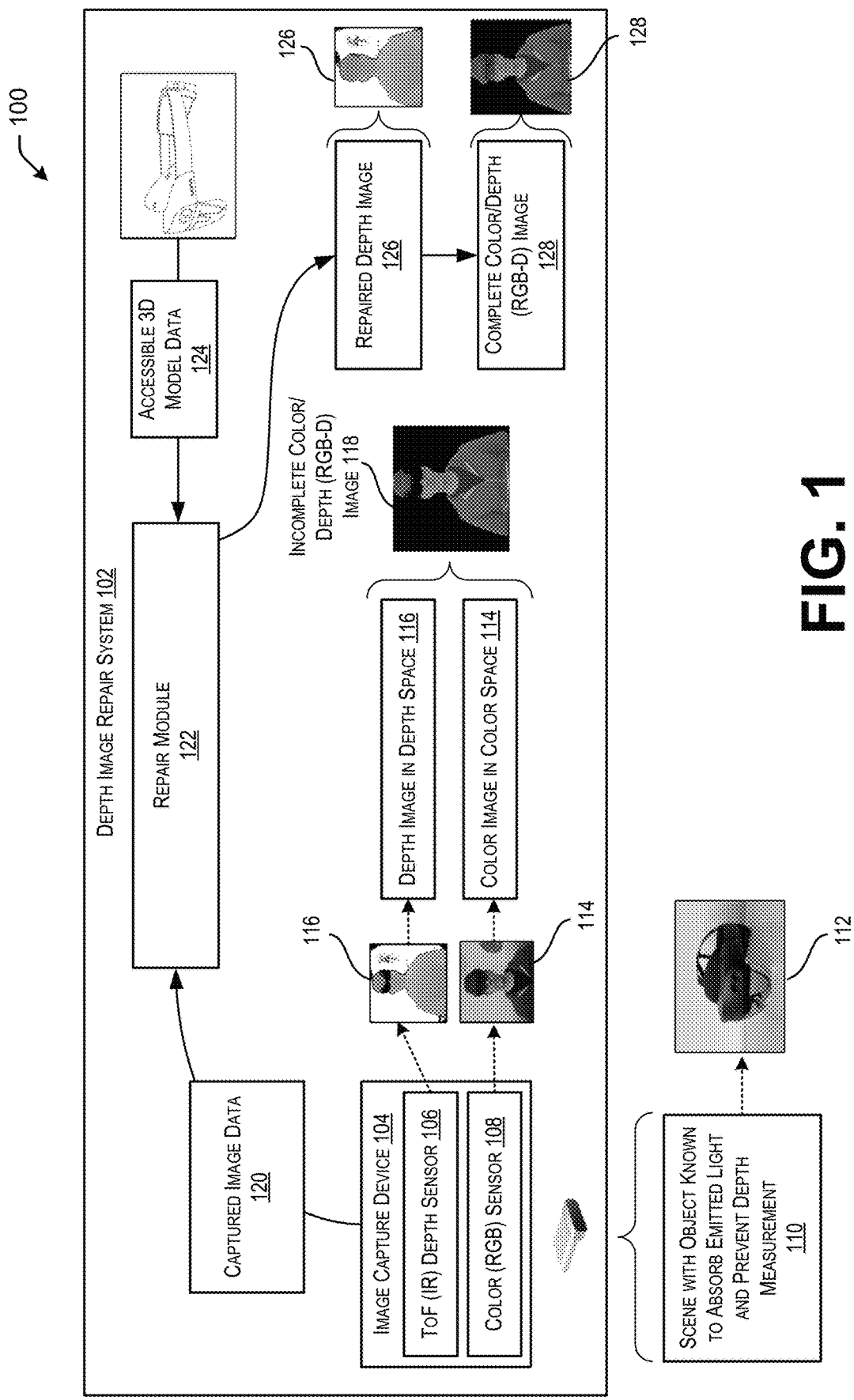
FIG. 1 illustrates an example environment in which a depth image repair system can repair a depth image using a corresponding color image and an accessible three-dimensional model of an object that causes corrupt or missing depth values to exist in the depth image.

FIG. 1 illustrates an example environment 100 in which a depth image repair system 102 can repair a depth image using a corresponding color image and an accessible three-dimensional model of an object that causes corrupt or missing depth values to exist in the depth image. The depth image repair system 102 includes an image capture device 104, or is in some way connected (e.g., via a network connection) to an image capture device 104.

The image capture device 104 includes a time-of-flight (ToF) depth sensor 106 (e.g., a ToF depth sensor that emits an infra-red signal) and color sensor 108 (e.g., RGB sensor). The image capture device 104 is configured to capture a sequence of frames (e.g., image or video frames) that represent a real-world scene 110 that includes a physical object that is known to absorb the light emitted by the ToF depth sensor 106. In one example, this object is a head-mounted display device 112 where the transparent visor prevents the light from being reflected. Consequently, the ToF depth sensor 106 is unable to accurately determine depth values for pixels associated with a region of the object that absorbs the light emitted by the ToF depth sensor 106.

To this end, the color sensor 108 is configured to generate a color image in a color space 114 and the ToF depth sensor 106 is configured to generate a depth image in a depth space 116. As shown in FIG. 1, the color image 114 of a person wearing a head-mounted display device 112 does not have any visible problems. However, the depth image 116 of the person wearing the head-mounted display device 112 includes dark holes around the users eyes where the transparent visor is located. Ultimately, this causes an incomplete color-depth (e.g., RGB-D) image 118 to be reproduced that clearly has problems with respect to representing and/or reconstructing the head-mounted display device and/or the user's head and eyes.

To resolve this problem, the image capture device 104, or an application that uses the images 114, 116 captured by the image capture device 104, is configured to provide the captured image data 120 to a repair module 122. As described above, the captured image data 120 may include a sequence of frames that comprise a video (e.g., of a person wearing a head-mounted display device 112). In one example, the image capture device 104 is stationary. However, in another example, the image capture device 104 is moveable such that image frames can be captured from multiple different viewpoints within a physical environment.

The repair module is 122 is configured to use accessible three-dimensional model data 124 (e.g., a CAD mesh model) associated with the object (e.g., the head-mounted display device) to repair the depth image 126 so that it no longer includes the dark holes shown in the initially captured depth image 116. Accordingly, a complete color-depth image (e.g., RGB-D) image 128 can be reproduced that no longer has problems with respect to representing and/or reconstructing the head-mounted display device and/or the user's head and eyes.

Figure 2:
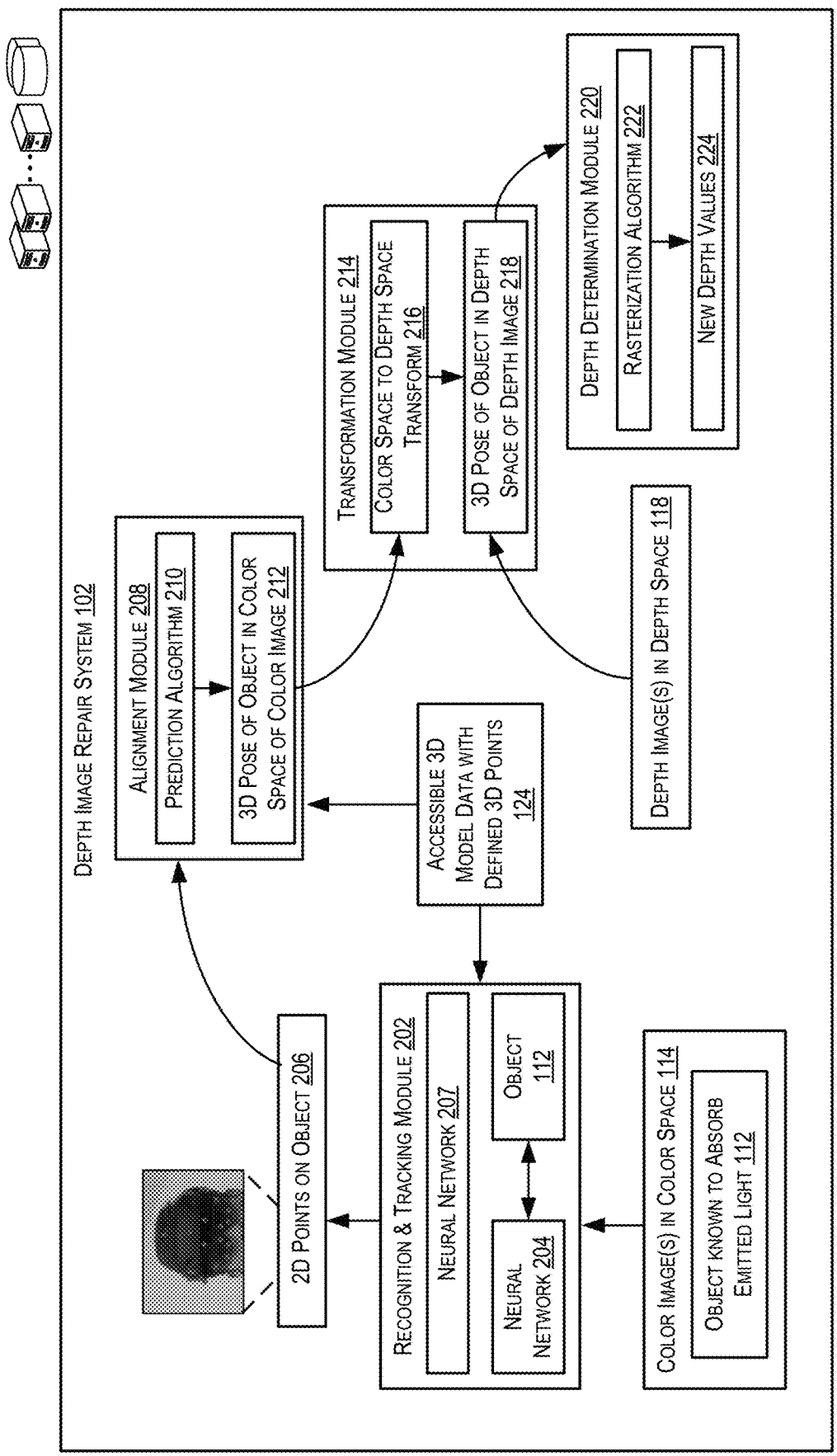
FIG. 2 illustrates further components and/or modules useable in the depth image repair system.

FIG. 2 illustrates further components and/or modules useable in the depth image repair system 102. As shown, the depth image repair system 102 obtains the color image(s) in the color space 114 of the image capture device 104 and the depth image(s) in the depth space 116 of the image capture device 104.

A recognition and tracking module 202 is configured to detect (e.g., recognize) an object 112 in the color image 114 that is known to include a region (e.g., a surface) that absorbs the light emitted by the time-of-flight depth sensor 106. In one example, the recognition and tracking module 202 is configured with a neural network 204 or another form of artificial intelligence which can detect any one of a plurality of objects known to cause the aforementioned problems in the depth image. For example, a Deep Neural Network (DNN) model may be trained using thousands or even millions of color image frames that are each individually annotated to indicate the shape, position, and/or orientation of an object known to cause problems with respect to depth value determination.

Once detected, the recognition and tracking module 202 is configured to predict two-dimensional points 206 on the object in the color image. This prediction can be implemented via another neural network 207. The two-dimensional points 206 correspond to three-dimensional points that are predefined in the accessible three-dimensional model of the object 124. For instance, the three-dimensional points in the three-dimensional model of the object 124 are manually defined in advance and can be any points on the three-dimensional model of the object 124. In some instance, they may be points associated with important/distinctive corners and edges of the region of the object 206 that absorbs the light emitted by the time-of-flight depth sensor. Example three-dimensional models may be readily generated by use of computer-aided design (CAD) software programs, and thus, the three-dimensional model data that defines the three-dimensional points 124 may be a three-dimensional CAD "mesh" model.

The color image with the two-dimensional points 206 is then passed to an alignment module 208 configured to apply a prediction algorithm 210 to the color image to compute a three-dimensional pose of the object in the color space of the color image 212. The prediction algorithm 210 computes the three-dimensional pose of the object in the color space of the color image 212 by positioning and/or rotating the three-dimensional model of the object 124 until the two-dimensional points on the object in the color image align with the corresponding three-dimensional points that are predefined in the three-dimensional model of the object 124.

In various examples, the prediction algorithm 210 uses a six degrees of freedom (6DoF) approach to predict the alignment. For instance, a Perspective-n-Point (PnP) algorithm is configured to estimate the pose of the image capture device 104 relative to the captured scene, and this estimation can be extended to align the three-dimensional landmarks, defined via an accessible three-dimensional mesh model, with the two-dimensional landmarks on the object in the color image.

Now that the alignment module 208 has computed a predicted three-dimensional pose of the object in the color image 212, a transformation module 214 applies a transform 216 between the color space of the color image and the depth space of the depth image to compute a three-dimensional pose of the object in the depth space of the depth image 218. This transform 216 may be necessary in scenarios where the color and depth coordinate spaces do not have the same origin and the axes are not colinear due to camera/sensor differences.

Next, a depth determination module 220 can use the three-dimensional pose of the object in the depth space of the depth image 218 to repair depth values for pixels in the depth image 118 that are associated with the region of the object that absorbs the light emitted by the ToF depth sensor 106. For instance, the depth determination module 220 can apply a rasterization algorithm 222 that is configured to determine the distance between the image capture device 104 (e.g., the ToF depth sensor 106) and a point (e.g., pixel) on the three-dimensional pose of the object in the depth space of the depth image 218. In one example, the rasterization algorithm 222 projects vertices that make up triangles on to a depth plane and uses a technique to fill up the pixels that are covered by a triangle with a new depth value 224.

The depth determination module 220 can determine whether a new depth value 224 for a pixel associated with the three-dimensional pose of the object in the depth space of the depth image should replace a previous depth value initially captured and computed for the depth mage 118. The depth determination module 220 may be configured to replace a previous depth value for the pixel with the new depth value 224 if the previous depth value is corrupted (e.g., is completely missing or is greater than the new depth value 224).

Consequently, the original depth image is repaired with more accurate depth values. This allows for an improved RGB-Depth (RGB-D) image to be produced. Moreover, once the object has been detected in a first color image frame of a video, the recognition and tracking module 202 is configured to track the object in subsequent color image frames of the video. In various examples, different neural networks can be used to first detect the object and then to track the object. Tests have shown that a first neural network for detection takes about nine milliseconds per frame to repair the depth values and that a second neural network for tracking (once the object is already detected) takes about three milliseconds per frame to repair depth values.

Figure 3:
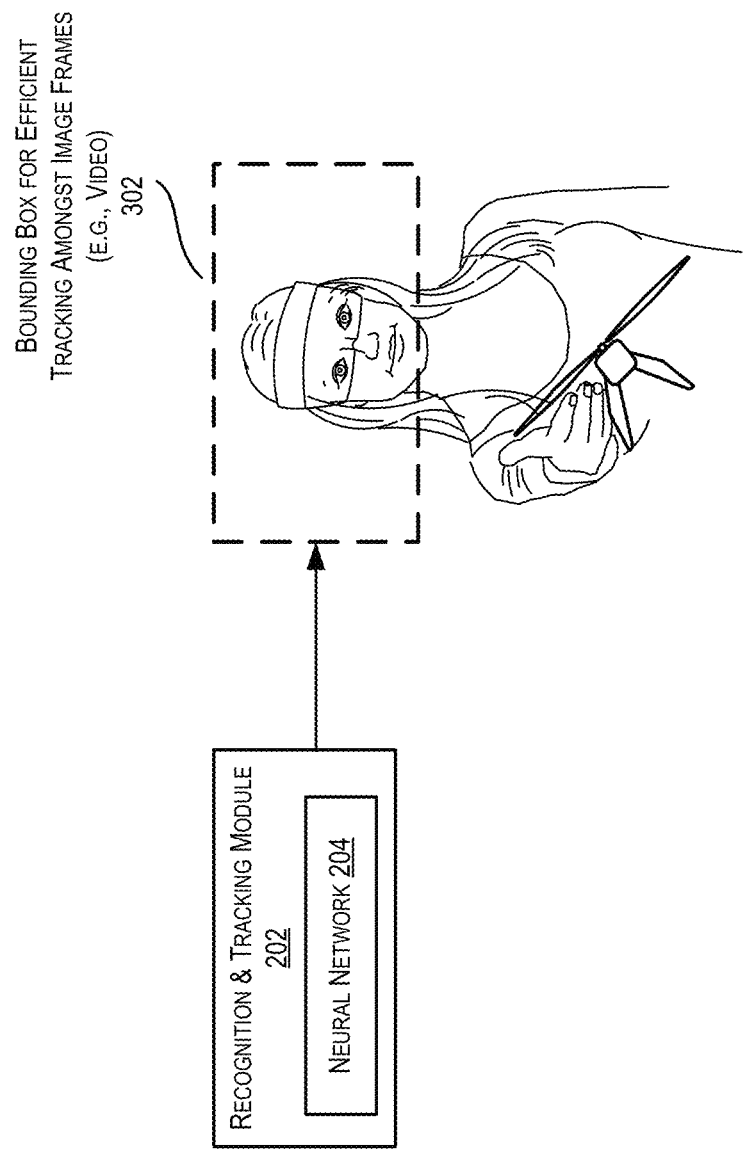
FIG. 3 illustrates how a bounding box can be used to focus a recognition and tracking module on an area of a color image frame in which an object is located and/or is likely to move from one color image frame to the next in a sequence of color image frames (e.g., a video).

FIG. 3 illustrates how a bounding box 302 can be used to focus the recognition and tracking module 202 on an area of a color image frame in which an object is located and/or is likely to move from one color image frame to the next in a sequence of color image frames (e.g., a video). This enables the neural network 204 to operate more efficiently with regard to tracking the movement of the object within the color image frames since a whole image frame does not need to be analyzed for tracking purposes.

Figure 4:
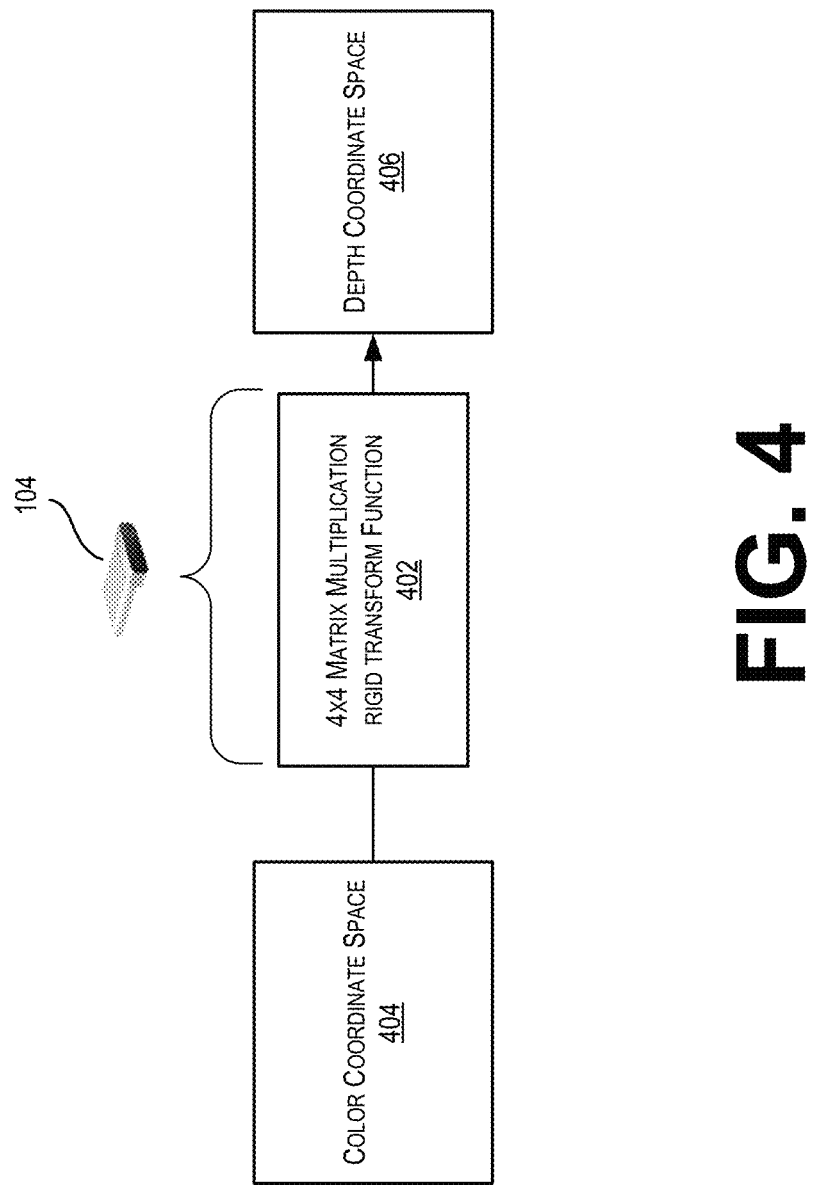
FIG. 4 illustrates a transform that is used to convert between a color coordinate space and a depth coordinate space so that the depth image can be repaired.

FIG. 4 illustrates a transformation function 402 that is used to convert between a color coordinate space 404 and a depth coordinate space 406 so that the depth image can be repaired. In one example, the transformation function 402 comprises 4×4 matrix multiplication as follows:

pose_in_color_space=pose_in_depth_space*depth_to_color_transform

Here, the depth_to_color_transform is a 4×4 rigid transform that can be derived or retrieved from calibration information (e.g., calibration functions) associated with the image capture device 104 (e.g., the calibration information may be baked into the image capture device 104 when out-of-factory).

Figure 5:
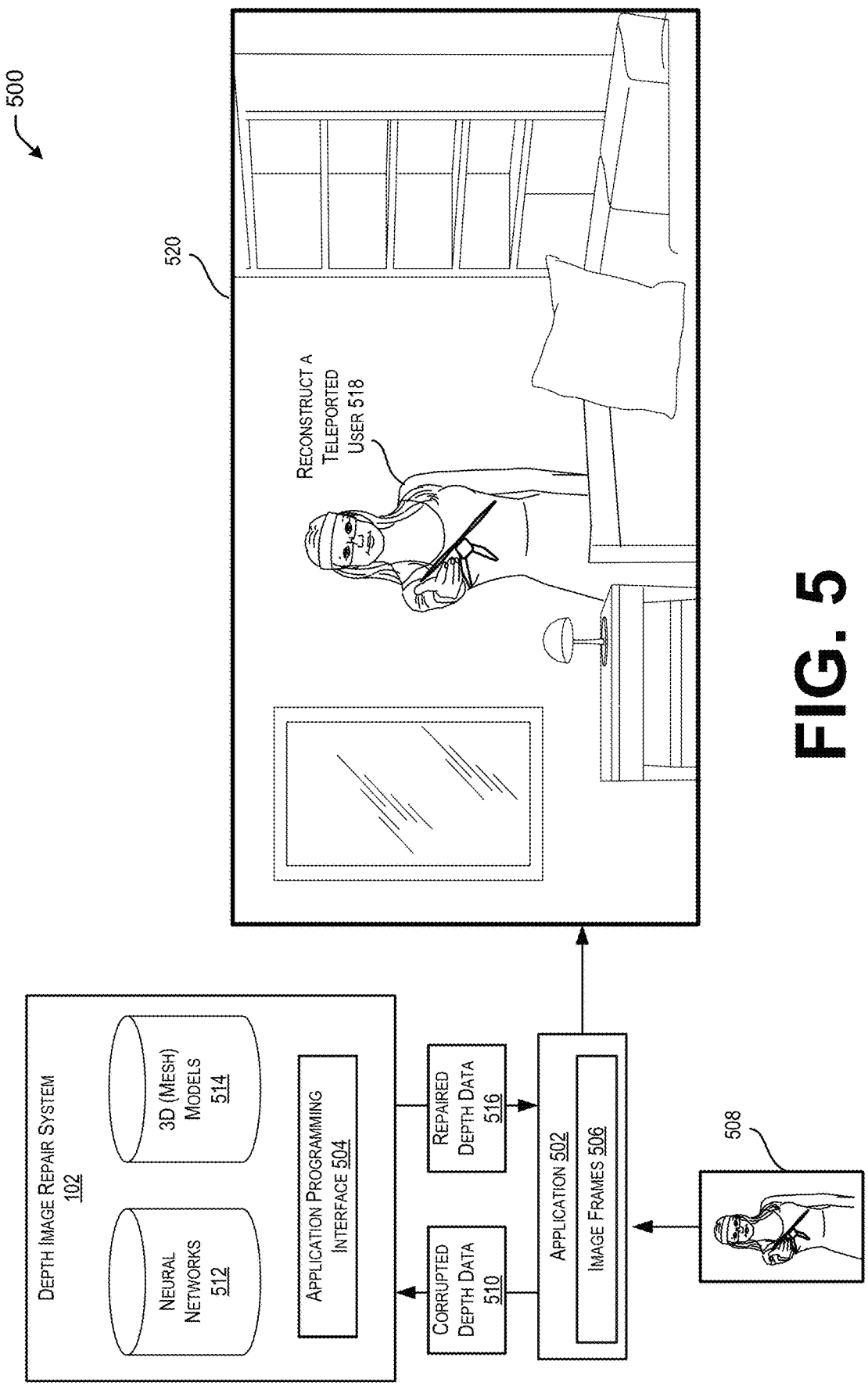
FIG. 5 illustrates an example environment in which the depth image repair system can be accessed by any one of multiple different applications via an application programming interface.

FIG. 5 illustrates an example environment 500 in which the depth image repair system 102 can be accessed by any one of multiple different applications 502 via an application programming interface 504. For example, the application 502 may be configured to obtain color and depth image frames 506 of a real-world scene 508 from an image capture device 104. As described above, these image frames 506 may include corrupted depth data 510 (e.g., missing or incorrect depth values for pixels) due to an object in the scene that absorbs light emitted by a ToF depth sensor 106.

Accordingly, the application 502 calls on the depth image repair system 102 and submits the image frames 506 with the corrupted depth data 510 via the application programming interface 504. The depth image repair system 102 may store or have access to a large number of neural networks 512 and three-dimensional models 514 of objects that are known to absorb the light emitted by a ToF depth sensor 106. The depth image repair system 102 is configured to repair the depth data, as discussed above with respect to FIGS. 1-4, and return the repaired depth data 516 (e.g., the complete RGB-D images) to the application 502. In one example, the application 502 is a teleportation application that teleports and reconstructs a user 518 wearing a head-mounted display device in a different real-world scene 520 compared to the scene 508 where the user is actually located.

Figure 6:
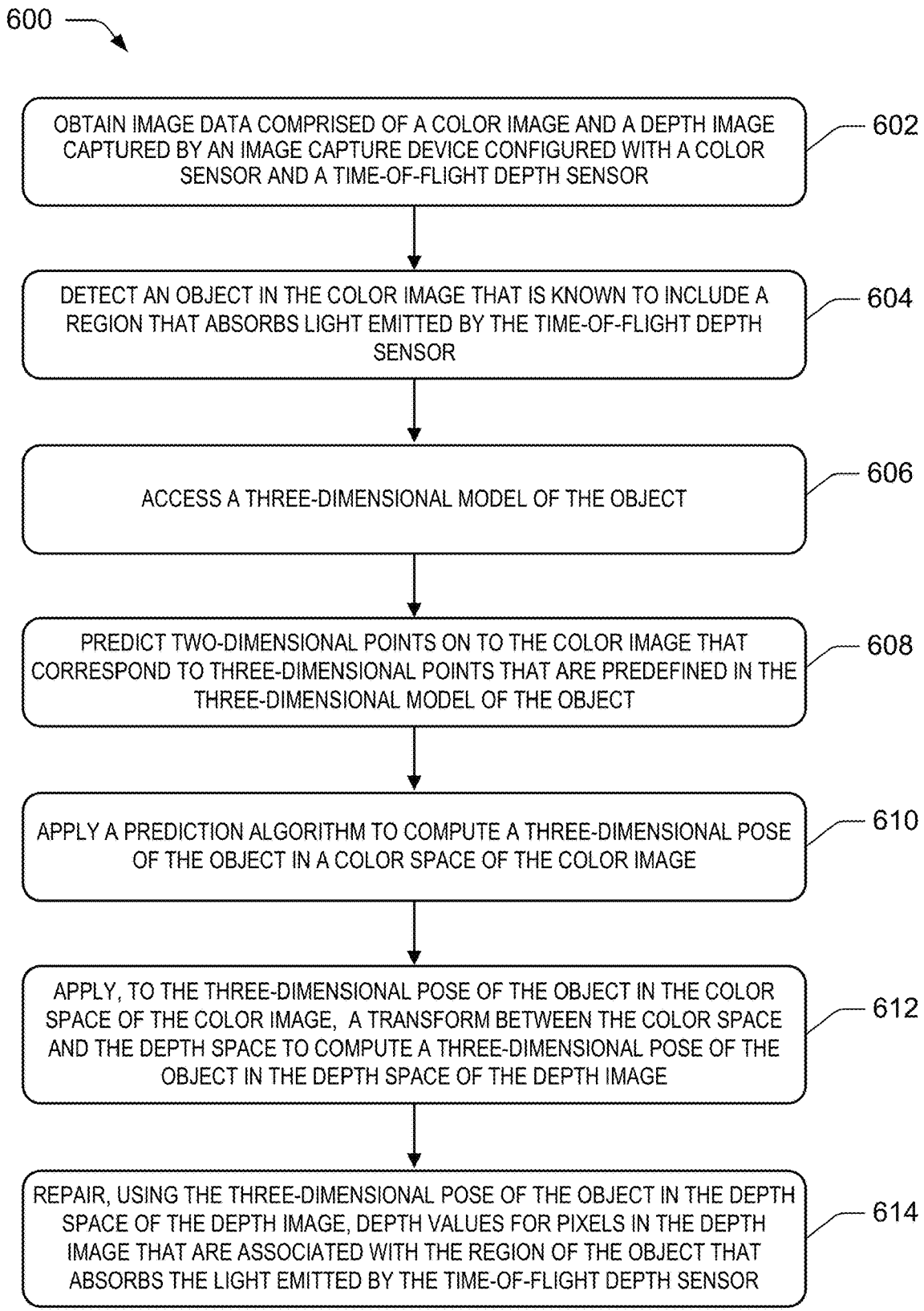
FIG. 6 illustrates an example process that repairs a depth image using a corresponding color image and an accessible three-dimensional model of an object that causes corrupt or missing depth values to exist in the depth image.

Turning now to FIG. 6, a process 600 is describe that facilitates repairing a depth image using a corresponding color image and an accessible three-dimensional model of an object that causes corrupt or missing depth values to exist in the depth image. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

At operation 602, image data comprised of a color image and a depth image is obtained. As described above, the color image and the depth image are captured by an image capture device configured with a color sensor and a time-of-flight depth sensor.

At operation 604, an object in the color image that is known to include a region that absorbs light emitted by the time-of-flight depth sensor is detected.

Next, at operation 606, a three-dimensional model of the object is accessed.

Moving to operation 608, two-dimensional points on the color image that corresponds to three-dimensional points that are predefined in the three-dimensional object model are predicted.

At operation 610, a prediction algorithm to compute a three-dimensional pose of the object in a color space of the color image is applied. In various examples, the prediction algorithm computes the three-dimensional pose of the object in the color space of the color image by at least one of positioning or rotating the three-dimensional model of the object until the two-dimensional points on the color image align with corresponding three-dimensional points that are predefined in the three-dimensional model of the object.

At operation 612, a transform between the color space and the depth space is applied to the three-dimensional pose of the object in the color space of the color image to compute a three-dimensional pose of the object in the depth space of the depth image.

At operation 614, depth values for pixels in the depth image that are associated with the region of the object that absorbs the light emitted by the time-of-flight depth sensor are repaired using the three-dimensional pose of the object in the depth space of the depth image.

Figure 7:
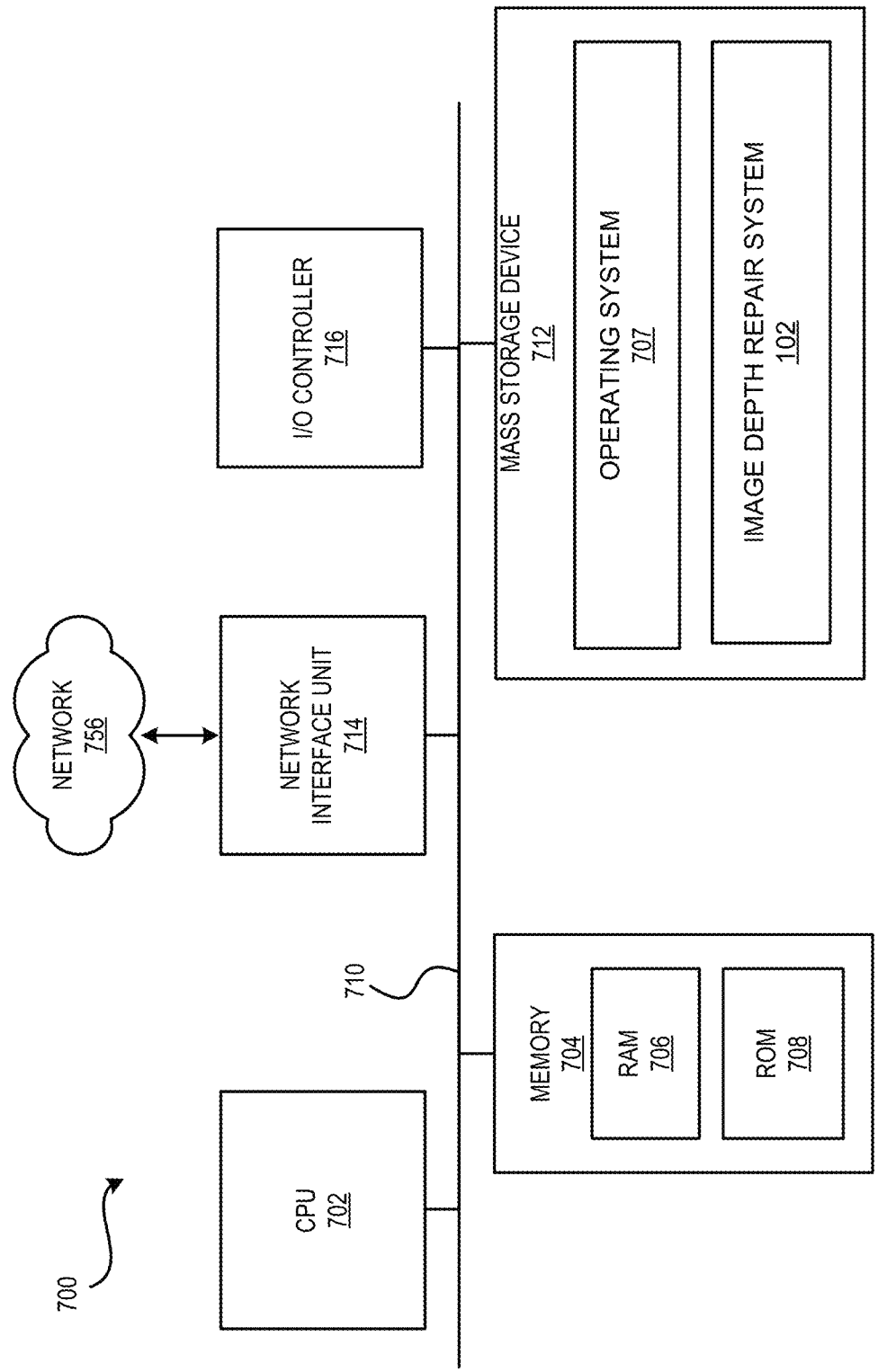
FIG. 7 shows additional details of an example computer architecture for a computer, such as such as a server and/or server cluster, capable of executing the program components described herein.

FIG. 7 shows additional details of an example computer architecture 700 for a computer, such as such as a server and/or server cluster, capable of executing the program components described herein. Thus, the computer architecture 700 illustrated in FIG. 7 illustrates an architecture for a server computer, a mobile phone, a PDA, a smart phone, a desktop computer, a netbook computer, a tablet computer, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 707, other data, and one or more applications. The mass storage device 712 can also store computer-executable instruction for implementing the image depth repair system 102.

The mass storage device 712 is connected to the CPU 702 through a mass storage controller connected to the bus 710. The mass storage device 712 and its associated computer-readable media provide non-volatile storage for the computer architecture 700. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network. The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, or electronic stylus. Similarly, the input/output controller 716 may provide output to a display screen, a printer, or other type of output device.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

The disclosure presented herein also encompasses the subject matter set forth in the following clauses.

Example Clause A, a method comprising: obtaining image data comprised of a color image and a depth image captured by an image capture device configured with a color sensor and a time-of-flight depth sensor; detecting, using a first neural network, an object in the color image that is known to include a region that absorbs light emitted by the time-of-flight depth sensor; accessing a three-dimensional model of the object; in response to the detected object, predicting, using a second neural network, two-dimensional points on the color image that correspond to three-dimensional points that are predefined in the three-dimensional object model; applying a prediction algorithm to compute a three-dimensional pose of the object in a color space of the color image, wherein application of the prediction algorithm computes the three-dimensional pose of the object in the color space of the color image by at least one of positioning or rotating the three-dimensional model of the object until the two-dimensional points on the color image align with the corresponding three-dimensional points that are predefined in the three-dimensional model of the object; applying, to the three-dimensional pose of the object in the color space of the color image, a transform between the color space and the depth space to compute a three-dimensional pose of the object in the depth space of the depth image; and repairing, using the three-dimensional pose of the object in the depth space of the depth image, depth values for pixels in the depth image that are associated with the region of the object that absorbs the light emitted by the time-of-flight depth sensor.

Example Clause B, the method of Example Clause A, wherein repairing the depth values associated with the region of the object that absorbs the light emitted by the time-of-flight depth sensor comprises: applying a rasterization algorithm to determine a new depth value for a pixel associated with the three-dimensional pose of the object in the depth space of the depth image; and replacing a previous depth value for the pixel with the new depth value if the previous depth value is missing or is greater than the new depth value.

Example Clause C, the method of Example Clause A or Example Clause B, wherein the color image and the depth image are configured to generate an RGB-D image.

Example Clause D, the method of any one of Example Clauses A through C, wherein the prediction algorithm comprises a perspective-n-point algorithm.

Example Clause E, the method of any one of Example Clauses A through D, further comprising using the first neural network to configure a bounding box to track movement of the object in a scene.

Example Clause F, the method of any one of Example Clauses A through E, wherein the transform between the color space and the depth space comprises a four-by-four matrix multiplication rigid transform.

Example Clause G, the method of Example Clause F, wherein the four-by-four matrix multiplication rigid transform is defined via a calibration function defined for the color sensor and the time-of-flight depth sensor.

Example Clause H, the method of any one of Example Clauses A through G, wherein: the image frame is obtained from an application via an application programming interface as part of a sequence of image frames; repairing the depth values associated with the region of the object that absorbs the infra-red signal emitted by the time-of-flight depth sensor enables a corrected RGB-D image to be produced; the method further comprises providing the corrected RGB-D image to the application.

Example Clause I, a system comprising: one or more processing units; and computer storage media storing instructions that, when executed by the one or more processing units, cause the system to perform operations comprising: obtaining image data comprised of a color image and a depth image captured by an image capture device configured with a color sensor and a time-of-flight depth sensor; detecting, using a first neural network, an object in the color image that is known to include a region that absorbs light emitted by the time-of-flight depth sensor; accessing a three-dimensional model of the object; in response to the detected object, predicting, using a second neural network, two-dimensional points on the color image that correspond to three-dimensional points that are predefined in the three-dimensional object model; applying a prediction algorithm to compute a three-dimensional pose of the object in a color space of the color image, wherein application of the prediction algorithm computes the three-dimensional pose of the object in the color space of the color image by at least one of positioning or rotating the three-dimensional model of the object until the two-dimensional points on the color image align with the corresponding three-dimensional points that are predefined in the three-dimensional model of the object; applying, to the three-dimensional pose of the object in the color space of the color image, a transform between the color space and the depth space to compute a three-dimensional pose of the object in the depth space of the depth image; and repairing, using the three-dimensional pose of the object in the depth space of the depth image, depth values for pixels in the depth image that are associated with the region of the object that absorbs the light emitted by the time-of-flight depth sensor.

Example Clause J, the system of Example Clause I, wherein repairing the depth values associated with the region of the object that absorbs the light emitted by the time-of-flight depth sensor comprises: applying a rasterization algorithm to determine a new depth value for a pixel associated with the three-dimensional pose of the object in the depth space of the depth image; and replacing a previous depth value for the pixel with the new depth value if the previous depth value is missing or is greater than the new depth value.

Example Clause K, the system of Example Clause I or Example Clause J, wherein the color image and the depth image are configured to generate an RGB-D image.

Example Clause L, the system of any one of Example Clauses I through K, wherein the prediction algorithm comprises a perspective-n-point algorithm.

Example Clause M, the system of any one of Example Clauses I through L, wherein the operations further comprise using the first neural network to configure a bounding box to track movement of the object in a scene.

Example Clause N, the system of any one of Example Clauses I through M, wherein the transform between the color space and the depth space comprises a four-by-four matrix multiplication rigid transform.

Example Clause O, the system of Example Clauses N, wherein the four-by-four matrix multiplication rigid transform is defined via a calibration function defined for the color sensor and the time-of-flight depth sensor.

Example Clause P, the system of any one of Example Clauses I through O, wherein: the image frame is obtained from an application via an application programming interface as part of a sequence of image frames; repairing the depth values associated with the region of the object that absorbs the infra-red signal emitted by the time-of-flight depth sensor enables a corrected RGB-D image to be produced; the operations further comprise providing the corrected RGB-D image to the application.

Example Clause Q, computer storage media storing instructions that, when executed by one or more processing units, cause a system to perform operations comprising: obtaining image data comprised of a color image and a depth image captured by an image capture device configured with a color sensor and a time-of-flight depth sensor; detecting, using a first neural network, an object in the color image that is known to include a region that absorbs light emitted by the time-of-flight depth sensor; accessing a three-dimensional model of the object; in response to the detected object, predicting, using a second neural network, two-dimensional points on the color image that correspond to three-dimensional points that are predefined in the three-dimensional object model; applying a prediction algorithm to compute a three-dimensional pose of the object in a color space of the color image, wherein application of the prediction algorithm computes the three-dimensional pose of the object in the color space of the color image by at least one of positioning or rotating the three-dimensional model of the object until the two-dimensional points on the color image align with the corresponding three-dimensional points that are predefined in the three-dimensional model of the object; applying, to the three-dimensional pose of the object in the color space of the color image, a transform between the color space and the depth space to compute a three-dimensional pose of the object in the depth space of the depth image; and repairing, using the three-dimensional pose of the object in the depth space of the depth image, depth values for pixels in the depth image that are associated with the region of the object that absorbs the light emitted by the time-of-flight depth sensor.

Example Clause R, the computer storage media of Example Clause Q, wherein repairing the depth values associated with the region of the object that absorbs the light emitted by the time-of-flight depth sensor comprises: applying a rasterization algorithm to determine a new depth value for a pixel associated with the three-dimensional pose of the object in the depth space of the depth image; and replacing a previous depth value for the pixel with the new depth value if the previous depth value is missing or is greater than the new depth value.

Example Clause S, the computer storage media of Example Clause Q or Example Clause R, wherein the prediction algorithm comprises a perspective-n-point algorithm.

Example Clause T, the computer storage media of any one of Example Clauses Q through S, wherein the operations further comprise using the first neural network to configure a bounding box to track movement of the object in a scene.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different images).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
    obtaining image data comprised of a color image and a depth image captured by an image capture device configured with a color sensor and a time-of-flight depth sensor;
    detecting, using a first neural network, an object in the color image that is known to include a surface that is composed of material that at least partly absorbs light emitted by the time-of-flight depth sensor, resulting in corrupted or missing depth values for pixels in the depth image that are associated with the surface;
    accessing a three-dimensional model of the object, wherein the three-dimensional model of the object defines three-dimensional points associated with at least one of edges or corners of the surface;
    in response to detecting the object, predicting, using a second neural network, two-dimensional points on the color image that correspond to the three-dimensional points associated with the at least one of the edges or the corners of the surface;
    applying a prediction algorithm to compute a three-dimensional pose of the object in a color space of the color image, wherein application of the prediction algorithm computes the three-dimensional pose of the object in the color space of the color image by at least one of positioning or rotating the three-dimensional model of the object until the two-dimensional points on the color image align with corresponding three-dimensional points defined in the three-dimensional model of the object;
    applying, to the three-dimensional pose of the object in the color space of the color image, a transform between the color space and the depth space to compute a three-dimensional pose of the object in the depth space of the depth image, wherein the transform between the color space and the depth space is defined via a calibration function defined for the color sensor and the time-of-flight depth sensor; and
    repairing, using the three-dimensional pose of the object in the depth space of the depth image, the corrupted or missing depth values for the pixels in the depth image that are associated with the surface.

2. The method of claim 1, wherein repairing the corrupted or missing depth values for the pixels in the depth image that are associated with the surface comprises:
    applying a rasterization algorithm to determine a new depth value for a pixel associated with the three-dimensional pose of the object in the depth space of the depth image; and
    replacing a previous depth value for the pixel with the new depth value if the previous depth value is missing or is greater than the new depth value.

3. The method of claim 1, wherein the color image and the depth image are configured to generate an RGB-D image.

4. The method of claim 1, wherein the prediction algorithm comprises a perspective-n-point algorithm.

5. The method of claim 1, further comprising using the first neural network to configure a bounding box to track movement of the object in a scene.

6. The method of claim 1, wherein the transform between the color space and the depth space comprises a four-by-four matrix multiplication rigid transform.

7. The method of claim 1, wherein:
    the image frame is obtained from an application via an application programming interface as part of a sequence of image frames;
    repairing the corrupted or missing depth values for the pixels in the depth image that are associated with the surface enables a corrected RGB-D image to be produced;
    the method further comprises providing the corrected RGB-D image to the application.

8. A system comprising:
    one or more processing units; and
    computer storage media storing instructions that, when executed by the one or more processing units, cause the system to perform operations comprising:
        obtaining image data comprised of a color image and a depth image captured by an image capture device configured with a color sensor and a time-of-flight depth sensor;
        detecting, using a first neural network, an object in the color image that is known to include a surface that is composed of material that at least partly absorbs light emitted by the time-of-flight depth sensor, resulting in corrupted or missing depth values for pixels in the depth image that are associated with the surface;
        accessing a three-dimensional model of the object, wherein the three-dimensional model of the object defines three-dimensional points associated with at least one of edges or corners of the surface;
        in response to detecting the object, predicting, using a second neural network, two-dimensional points on the color image that correspond to the three-dimensional points associated with the at least one of the edges or the corners of the surface;
        applying a prediction algorithm to compute a three-dimensional pose of the object in a color space of the color image, wherein application of the prediction algorithm computes the three-dimensional pose of the object in the color space of the color image by at least one of positioning or rotating the three-dimensional model of the object until the two-dimensional points on the color image align with corresponding three-dimensional points defined in the three-dimensional model of the object;

applying, to the three-dimensional pose of the object in the color space of the color image, a transform between the color space and the depth space to compute a three-dimensional pose of the object in the depth space of the depth image, wherein the transform between the color space and the depth space is defined via a calibration function defined for the color sensor and the time-of-flight depth sensor; and repairing, using the three-dimensional pose of the object in the depth space of the depth image, the corrupted or missing depth values for the pixels in the depth image that are associated with the surface.

9. The system of claim 8, wherein repairing the corrupted or missing depth values for the pixels in the depth image that are associated with the surface comprises:

applying a rasterization algorithm to determine a new depth value for a pixel associated with the three-dimensional pose of the object in the depth space of the depth image; and replacing a previous depth value for the pixel with the new depth value if the previous depth value is missing or is greater than the new depth value.

10. The system of claim 9, wherein:

the image frame is obtained from an application via an application programming interface as part of a sequence of image frames;

repairing the corrupted or missing depth values for the pixels in the depth image that are associated with the surface enables a corrected RGB-D image to be produced;

the operations further comprise providing the corrected RGB-D image to the application.

11. The system of claim 8, wherein the color image and the depth image are configured to generate an RGB-D image.

12. The system of claim 8, wherein the prediction algorithm comprises a perspective-n-point algorithm.

13. The system of claim 8, wherein the operations further comprise using the first neural network to configure a bounding box to track movement of the object in a scene.

14. The system of claim 8, wherein the transform between the color space and the depth space comprises a four-by-four matrix multiplication rigid transform.

15. Computer storage media storing instructions that, when executed by one or more processing units, cause a system to perform operations comprising:

obtaining image data comprised of a color image and a depth image captured by an image capture device configured with a color sensor and a time-of-flight depth sensor;

detecting, using a first neural network, an object in the color image that is known to include a surface that is composed of material that at least partly absorbs light emitted by the time-of-flight depth sensor, resulting in corrupted or missing depth values for pixels in the depth image that are associated with the surface;

accessing a three-dimensional model of the object, wherein the three-dimensional model of the object defines three-dimensional points associated with at least one of edges or corners of the surface;

in response to detecting the object, predicting, using a second neural network, two-dimensional points on the color image that correspond to the three-dimensional points associated with the at least one of the edges or the corners of the surface;

applying a prediction algorithm to compute a three-dimensional pose of the object in a color space of the color image, wherein application of the prediction algorithm computes the three-dimensional pose of the object in the color space of the color image by at least one of positioning or rotating the three-dimensional model of the object until the two-dimensional points on the color image align with corresponding three-dimensional points defined in the three-dimensional model of the object;

applying, to the three-dimensional pose of the object in the color space of the color image, a transform between the color space and the depth space to compute a three-dimensional pose of the object in the depth space of the depth image, wherein the transform between the color space and the depth space is defined via a calibration function defined for the color sensor and the time-of-flight depth sensor; and repairing, using the three-dimensional pose of the object in the depth space of the depth image, the corrupted or missing depth values for the pixels in the depth image that are associated with the surface.

16. The computer storage media of claim 15, wherein:

the three-dimensional points defined in three-dimensional model of the object are manually defined; and repairing the corrupted or missing depth values for the pixels in the depth image that are associated with the surface comprises:

applying a rasterization algorithm to determine a new depth value for a pixel associated with the three-dimensional pose of the object in the depth space of the depth image; and replacing a previous depth value for the pixel with the new depth value if the previous depth value is missing or is greater than the new depth value.

17. The computer storage media of claim 15, wherein the prediction algorithm comprises a perspective-n-point algorithm.

18. The computer storage media of claim 15, wherein the operations further comprise using the first neural network to configure a bounding box to track movement of the object in a scene.

* * * * *